(12) United States Patent
Wei et al.

(10) Patent No.: US 11,876,252 B1
(45) Date of Patent: Jan. 16, 2024

(54) PALLET STRUCTURE AND BATTERY ELECTROLYTE INJECTION APPARATUS

(71) Applicant: CONTEMPORARY AMPEREX TECHNOLOGY CO., LIMITED, Fujian (CN)

(72) Inventors: Dong Wei, Fujian (CN); Zhiguo Zhang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/201,192

(22) Filed: May 24, 2023

Related U.S. Application Data (63) Continuation of application No. PCT/CN2022/133656, filed on Nov. 23, 2022.

(30) Foreign Application Priority Data

Sep. 16, 2022 (CN) .......................... 202222450528.1

(51) Int. Cl.
*H01M 50/609* (2021.01)
*B65D 19/00* (2006.01)

(52) U.S. Cl.
CPC ...... *H01M 50/609* (2021.01); *B65D 19/0069* (2013.01); *B65D 2519/00079* (2013.01); *B65D 2519/00273* (2013.01); *B65D 2519/00293* (2013.01); *B65D 2519/00323* (2013.01)

(58) Field of Classification Search
CPC ...... B65D 19/0069; B65D 2519/00079; B65D 2519/00273; B65D 2519/00293; B65D 2519/00323; H01M 50/609

USPC ..................... 108/51.11, 55.1, 53.1
See application file for complete search history.

(56) References Cited

U.S. PATENT DOCUMENTS

| | | | | |
|---|---|---|---|---|
| 2,660,328 A | * | 11/1953 | Averill | B65D 7/26 108/53.5 |
| 3,626,869 A | * | 12/1971 | Colas | B65D 19/0012 108/51.11 |
| 3,675,596 A | * | 7/1972 | Colas | B65D 19/0012 108/51.11 |
| 5,918,551 A | * | 7/1999 | Liu | B65D 19/10 108/55.3 |

(Continued)

FOREIGN PATENT DOCUMENTS

| | | |
|---|---|---|
| CN | 209434292 U | 9/2019 |
| CN | 210335667 U | 4/2020 |

(Continued)

OTHER PUBLICATIONS

International Search Report and Written Opinion dated May 25, 2023, in corresponding PCT/CN2022/133656, 6 pages.

*Primary Examiner* — Jose V Chen
(74) *Attorney, Agent, or Firm* — XSENSUS LLP (57) ABSTRACT

This application relates to a pallet structure and a battery electrolyte injection apparatus. The pallet structure may include two pallets and a supporting assembly. Each of the pallets may include a supporting surface. The two pallets may be spaced apart vertically. The supporting assembly may be disposed between the two pallets. At least one of the pallets may include a base and a supporting plate. The supporting plate may be disposed on the base and include a supporting surface. The base may be a hollow member.

15 Claims, 7 Drawing Sheets

(56) References Cited

U.S. PATENT DOCUMENTS

| | | | | |
|---|---|---|---|---|
| 6,186,077 | B1* | 2/2001 | Lim | B65D 19/0095 |
| | | | | 108/57.17 |
| 6,202,569 | B1* | 3/2001 | Bailey | B65D 19/385 |
| | | | | 108/53.5 |
| 6,402,167 | B1* | 6/2002 | Calleja | B65D 19/44 |
| | | | | 280/47.35 |
| 7,959,059 | B2* | 6/2011 | Tamamori | B65D 19/44 |
| | | | | 108/55.3 |
| 7,997,213 | B1* | 8/2011 | Gauthier | B65D 88/022 |
| | | | | 294/67.1 |
| 9,327,873 | B2* | 5/2016 | Frankenberg | B65D 19/42 |
| 2005/0028710 | A1* | 2/2005 | Carpenter | B65D 81/053 |
| | | | | 108/51.11 |
| 2006/0213402 | A1* | 9/2006 | Grimal | B65D 19/44 |
| | | | | 108/51.11 |
| 2009/0120332 | A1* | 5/2009 | Heinrichs | B65D 19/12 |
| | | | | 211/1 |
| 2009/0255446 | A1* | 10/2009 | Kirkpatrick | B65D 19/0012 |
| | | | | 108/51.11 |
| 2011/0303129 | A1* | 12/2011 | Harris | B65D 19/385 |
| | | | | 108/51.11 |
| 2016/0101893 | A1* | 4/2016 | Moore | B65D 90/18 |
| | | | | 108/53.5 |
| 2017/0275050 | A1* | 9/2017 | Pang | B65D 19/0095 |

FOREIGN PATENT DOCUMENTS

| | | |
|---|---|---|
| CN | 111354918 A | 6/2020 |
| CN | 114084230 A | 2/2022 |

\* cited by examiner

PALLET STRUCTURE AND BATTERY ELECTROLYTE INJECTION APPARATUS

CROSS-REFERENCE TO RELATED APPLICATIONS

This present application is a bypass continuation application of International Application No. PCT/CN2022/133656, filed Nov. 23, 2022, which claims priority to Chinese Patent Application No. 202222450528.1, filed on Sep. 16, 2022 and entitled "PALLET STRUCTURE AND BATTERY ELECTROLYTE INJECTION APPARATUS", both of which are incorporated herein by reference in its entirety.

TECHNICAL FIELD

This application relates to the technical field of batteries, and in particular, to a pallet structure and a battery electrolyte injection apparatus pump.

BACKGROUND

An electrolytic solution may be injected into a battery in different manners including pressure-cap equal-pressure injection. The pressure-cap equal-pressure injection is an injection method by which an electrolytic solution is injected by an injection mechanism into a plurality of batteries placed in a pallet structure concurrently, so as to achieve high consistency and high efficiency of injection.

The pallet structure for use in the pressure-cap equal-pressure injection generally includes an upper pallet and a lower pallet. The upper pallet is configured to carry an injection mechanism, and the lower pallet is configured to carry batteries. A conventional upper pallet and lower pallet are heavy, thereby resulting in high cost of manufacturing.

SUMMARY

In view of the above problem, this application provides a pallet structure and a battery electrolyte injection apparatus to alleviate the problem of high manufacturing cost of the pallet structure caused by heavy weight of the upper and lower pallets.

According to a first aspect, this application provides a pallet structure. The pallet structure includes two pallets and a supporting assembly. Each of the pallets includes a supporting surface. The two pallets are spaced apart vertically. The supporting assembly is disposed between the two pallets. At least one of the pallets includes a base and a supporting plate. The supporting plate is disposed on the base and includes the supporting surface. The base is a hollow member.

In the technical solution of an embodiment of this application, the base in the pallet is of a hollow structure, thereby reducing the weight and consumed material of the base, reducing the weight and consumed material of the pallet, and in turn, reducing the manufacturing cost of the pallet structure.

In some embodiments, the base is made by splicing a plurality of tubes. In this case, the base is formed by splicing tubes. The through-hole in the tube reduces the weight of the base greatly, reduces the consumed material of the pallet, and in turn, reduces the manufacturing cost of the pallet structure.

In some embodiments, the base includes two longitudinal tubes and at least one transverse tube. The two longitudinal tubes are parallel to each other and spaced apart. Each transverse tube is connected between the two longitudinal tubes. The base is assembled by just connecting each transverse tube between the two longitudinal tubes, so that the base is formed conveniently. The transverse tubes and the longitudinal tubes are connected in a staggered manner, so that the strength of the base is high.

In some embodiments, there are at least two transverse tubes. All the transverse tubes are spaced apart along an extension direction of the longitudinal tubes. The transverse tubes are spaced apart from each other, so that the base not only reduces the weight and consumed materials by virtue of the through-holes in the transverse tubes and longitudinal tubes, but also forms a weight reducing space through the spacing between the transverse tubes. The base can further reduce the weight and consumed materials.

In some embodiments, the longitudinal tube and the transverse tube are both rectangular tubes. When the longitudinal tube and the transverse tube are both rectangular tubes, the surface that is of the longitudinal tube and the transverse tube and that is oriented toward the supporting plate may be planar, and therefore, the base can be surface-connected to the supporting plate, and the supporting plate provides more stable support. In addition, the rectangular tube is technically mature and cost-effective, thereby reducing the manufacturing cost of the base.

In some embodiments, the base is made of carbon fiber. In this case, the base is made of carbon fiber that is of low weight and high strength, thereby ensuring high reliability of support of the pallet structure.

In some embodiments, the supporting assembly includes a guide post. One end of the guide post is connected to a lower pallet, and the other end of the guide post is connected to an upper pallet. The supporting assembly is formed by a guide post, so that the structure is simple and the supporting is reliable.

In some embodiments, the base includes a hollow portion, and a reinforcing piece is disposed in the hollow portion. The reinforcing piece is disposed in the hollow portion of the base, thereby increasing the strength of the base and ensuring high supporting strength of the pallet.

In some embodiments, the hollow portion of the base of the upper pallet includes a first hollow portion. The reinforcing piece disposed in the first hollow portion includes a mating hole mated to the guide post. In this case, the reinforcing piece in the first hollow portion of the base of the upper pallet includes a mating hole mated to the guide post. The mating hole formed by the reinforcing piece can increase the strength and reliability of connection between the upper pallet and the guide post, and prevent the first hollow portion of the upper pallet from being deformed under pressure.

In some embodiments, the hollow portion of the base of the lower pallet includes a second hollow portion. The guide post is disposed on the second hollow portion and supported on the reinforcing piece. In this case, the reinforcing piece is disposed in the second hollow portion to increase the structural strength of the second hollow portion and prevent the guide post from being deformed under pressure when the guide post is supported inside a second hollow.

In some embodiments, the hollow portion of the base of the lower pallet further includes a third hollow portion. The reinforcing piece disposed in the third hollow portion includes a positioning hole. The positioning hole is configured to mate with a positioning mechanism.

In some embodiments, the pallet structure further includes a spacer. The spacer is disposed on a lower pallet and is configured to partition the pallet into at least two placement regions. Each placement region is configured to place a battery cell. In this case, the spacer partitions the region of the pallet into a plurality of placement regions. The placement regions can restrict displacement of the battery cell on the pallet, implement more convenient positioning of the battery cell on the pallet, and facilitate placement of the battery cell.

In some embodiments, the pallet further includes a first snap-fastener and a second snap-fastener that are detachably snap-fastened. The first snap-fastener and the second snap-fastener are disposed on the two pallets respectively. During assembling of the pallet structure, when the upper pallet moves down in position along the guide post, the first snap-fastener and the second snap-fastener are fastened tightly to prevent the upper pallet from detaching from the guide post, thereby improving the reliability of mounting of the upper pallet.

According to a second aspect, this application provides a battery electrolyte injection apparatus, including the pallet structure and an injection mechanism. The supporting surface of a lower pallet is configured to place a battery cell. The injection mechanism is supported on the supporting surface of an upper pallet and is configured to inject an electrolytic solution into the battery cell.

In some embodiments, the injection mechanism includes an injection cup and a nozzle assembly. The injection cup is disposed on the upper pallet. The nozzle assembly is mated to the injection cup detachably and communicates with the injection cup, and is configured to inject the electrolytic solution into the battery cell. When a nozzle is damaged, the nozzle assembly can be removed and replaced without a need to remove the whole injection mechanism, thereby greatly facilitating the repair of the injection mechanism.

In some embodiments, the nozzle assembly includes a fixing plate, at least one nozzle, and a mounting piece. The fixing plate is detachably connected to the injection cup. The mounting piece is disposed on the fixing plate. Each nozzle is mounted on the mounting piece. The mounting piece is configured to implement communication between the injection cup and each nozzle. When one nozzle is damaged, other nozzles are usually also damaged. In this case, because the fixing plate is detachably connected to the injection cup on the injection mechanism, at least one nozzle may be disposed on the fixing plate. Therefore, at least one nozzle can be replaced at a time, thereby improving the efficiency of replacing the nozzle.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not intended to limit this application. In all the drawings, the same reference numeral represents the same component. In the drawings.

REFERENCE NUMERALS

1000. battery electrolyte injection apparatus; 100. pallet structure; 110. pallet; 110*a*. upper pallet; 110*b*. lower pallet; m. supporting surface; 111. base; 111*a*. longitudinal tube; 111*b*. transverse tube; k. hollow portion; k1. first hollow portion; p. mating hole; f positioning hole; k2. second hollow portion; k3. third hollow portion; 112. supporting plate; 113. reinforcing piece; 114. bushing; 120. supporting assembly; 121. guide post; 130. spacer; q. placement region; 140. first snap-fastener; 150. second snap-fastener; 160. supporting post; 200. injection mechanism; 210. injection cup; 220. nozzle assembly; 221. fixing plate; 222. nozzle; 223. mounting piece; 230. injection sheet metal part.

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "I" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

A pallet structure for use in pressure-cap equal-pressure injection generally includes an upper pallet and a lower pallet. The upper pallet is configured to carry an injection mechanism, and the lower pallet is configured to carry batteries.

The inventor of this application has noticed that in the pallet structure for use in a conventional pressure-cap equal-pressure injection, both the upper pallet and the lower pallet are of a solid one-piece plate-shaped structure. This structure is relatively heavy and results in high manufacturing cost of the pallet structure.

In view of the above problem, in order to reduce the manufacturing cost of the pallet structure, the inventor of this application has designed a pallet structure after in-depth research. The pallet structure includes two pallets and a supporting assembly. The two pallets are spaced apart vertically, and each of the pallets includes a supporting surface. The supporting assembly is disposed between the two pallets. At least one of the pallets includes a base and a supporting plate. The supporting plate is disposed on the base and includes the supporting surface. The base is a hollow member. In this case, the pallet is formed by the supporting plate and a hollow base. The weight of the pallet can be greatly reduced through the base, thereby reducing the weight of the pallet structure.

The pallet structure disclosed in an embodiment of this application is applicable in the field of battery electrolyte injection, and also applicable in other fields that need to carry and convey workpieces. The specific application fields of the pallet provided in this application are not limited.

A battery cell mentioned in an embodiment of this application means a minimum unit of a battery. The battery cell typically includes an end cap, a housing, an electrode assembly, and other functional components. The end cap and the housing close in to form an internal environment of the battery cell. Functional components such as electrode terminals may be disposed on the end cap. The electrode terminals may be configured to be electrically connected to the electrode assembly to output or input electrical energy of the battery cell. Generally, an injection port is provided on the end cap. The injection mechanism may inject an electrolytic solution into the battery cell through the injection port.

The electrode assembly is a component that reacts electrochemically in the battery cell, and is accommodated in the internal environment of the battery cell. An electrode assembly is primarily formed by winding or stacking a positive electrode plate and a negative electrode plate, and a separator is generally disposed between the positive electrode plate and the negative electrode plate. In a charge-and-discharge process of the battery, the positive active material on the positive electrode plate and the negative active material on the negative electrode plate react with the electrolytic solution. The tabs are connected to electrode terminals to form a current circuit.

Figure 1:
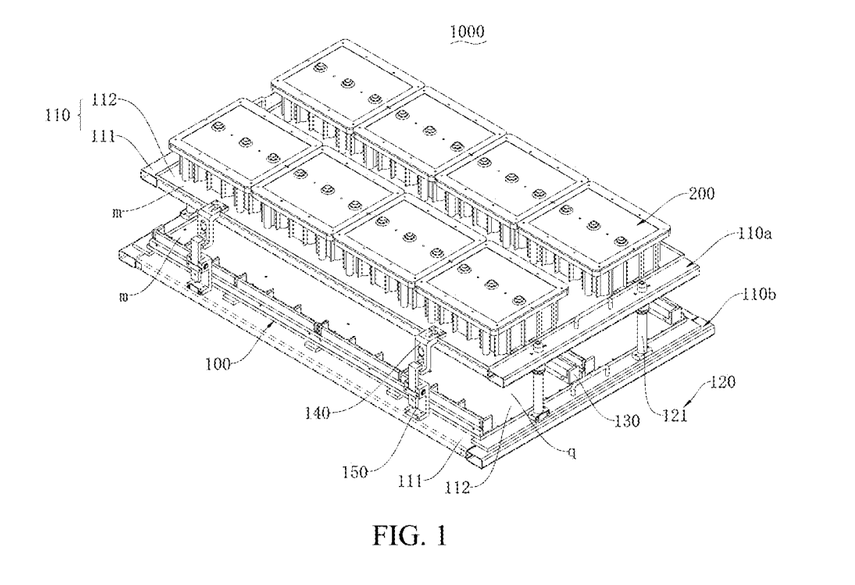
FIG. 1 is a schematic structural diagram of a battery electrolyte injection apparatus according to some embodiments of this application.
Figure 2:
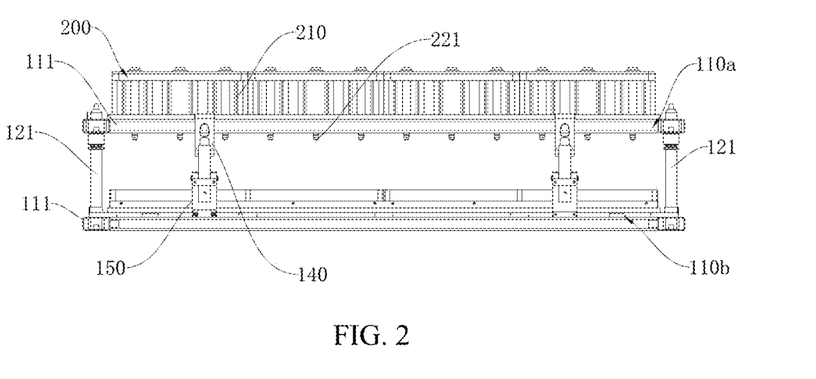
FIG. 2 is a side view of the battery electrolyte injection apparatus shown in FIG. 1.
Figure 3:
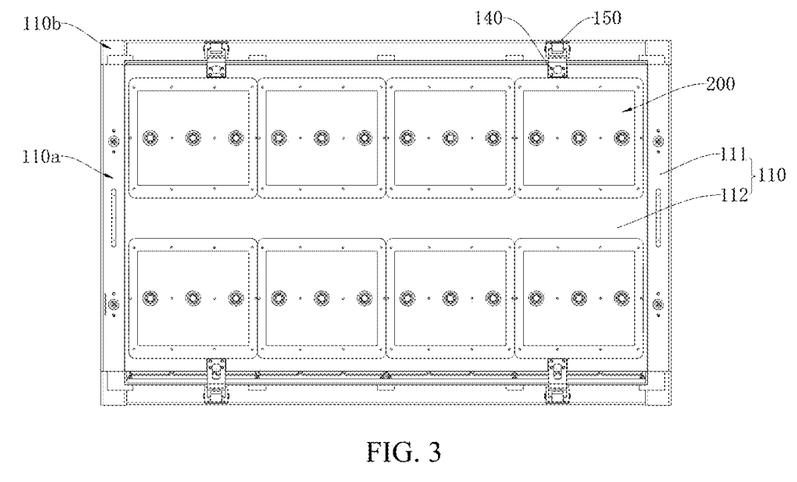
FIG. 3 is a top view of the battery electrolyte injection apparatus shown in FIG. 1.

According to some embodiments of this application, referring to FIG. 1, FIG. 2, and FIG. 3, this application provides a pallet structure 100, including two pallets 110 and a supporting assembly 120. Each of the pallets 110 includes a supporting surface m. The two pallets 110 are spaced apart vertically. The supporting assembly 120 is disposed between the two pallets 110. At least one of the pallets 110 includes a base 111 and a supporting plate 112. The supporting plate 112 is disposed on the base 111 and includes a supporting surface m. The base 111 is a hollow member.

The two pallets 110 are spaced apart vertically. The pallet 110 located above is an upper pallet 110a, and the pallet 110 located below is a lower pallet 110b. The "vertical" direction here just describes an arrangement orientation of the two pallets 110 of the pallet structure 100 in use, but does not restrict the status of the pallet structure 100. When the pallet structure 100 is in the conveyance state or other states, the two pallets 110 are not necessarily arranged vertically, but may be arranged alongside or in tandem, as long as the two pallets 110 are spaced apart in a specific direction.

The supporting assembly 120 is disposed between the upper pallet 110a and the lower pallet 110b to provide a supporting force for enabling the upper pallet 110a and the lower pallet 110b to be spaced apart. The supporting assembly 120 may be, but without being limited to, a supporting post 160, a supporting rod, a supporting bracket, or another structural form, and may be designed flexibly by a person skilled in the art by conventional means.

The supporting surface m of each pallet 110 is configured to place other components. For example, when the pallet structure 100 is applied to the field of battery electrolyte injection, the supporting surface m of the upper pallet 110a is configured to place the injection mechanism 200, and the supporting surface m of the lower pallet 110b is configured to place a battery cell.

The supporting plate 112 is a plate-shaped member with a thickness much greater than length and width. A surface of the supporting plate, which is located in the thickness direction, is configured to form the supporting surface m of the pallet 110. The supporting plate 112 may be a sheet metal or plastic part, without being specifically limited as long as the supporting plate can meet the supporting strength requirements. To reduce the weight of the pallet 110, a weight reducing portion such as a weight reducing hole or a weight reducing groove may be made in the supporting plate 112.

The base 111 is configured to support the supporting plate 112 and is a hollow member. The "hollow member" means a member in which a weight reducing space is designed. The weight reducing space may be in the form of a weight reducing cavity, a weight reducing groove, or a weight reducing hole. The weight reducing space can reduce the material to be used and reduce the weight of the base 111. As a hollow member, the base 111 may be structured in diverse forms. For example, the base 111 is a metal base 111 that is die-cast in one piece and that includes a plurality of weight reducing holes (or weight reducing grooves). As another example, the base 111 is formed by welding a plurality of rods (or beams), and some of the rods (or beams) define a spliced base 111 that contains a weight reducing space.

The supporting assembly 120 may be connected to the pallet 110 by the base 111, or connected to the pallet 110 by the supporting plate 112, or connected to both the base 111 and the supporting plate 112 concurrently, without being specifically limited. The upper pallet 110a may be constructed from the base 111 and the supporting plate 112, and the lower pallet 110b may also be constructed from the base 111 and the supporting plate 112.

In the pallet structure 100 described above, the base 111 in the pallet 110 is of a hollow structure, thereby reducing the weight and consumed material of the base 111, reducing the weight and consumed material of the pallet 110, and in turn, reducing the manufacturing cost of the pallet structure 100.

Figure 4:
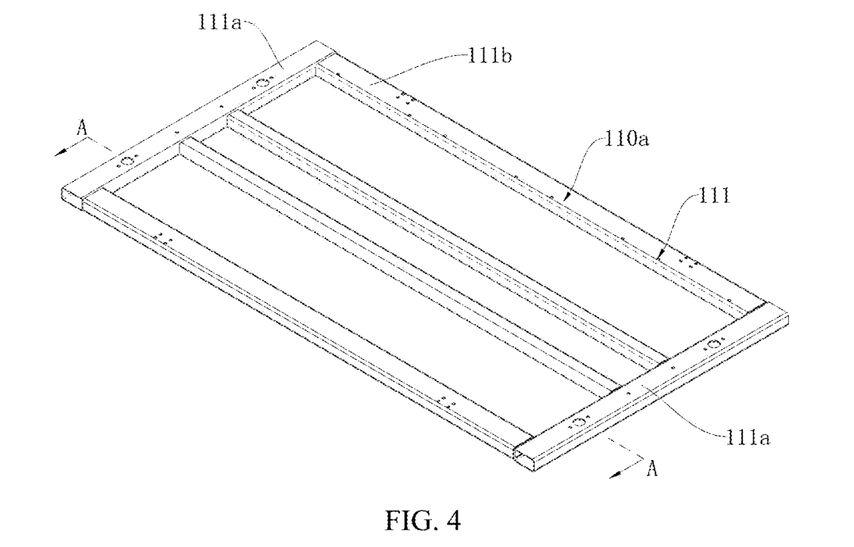
FIG. 4 is a schematic structural diagram of a bottom plate of an upper pallet according to some embodiments of this application.
Figure 7:
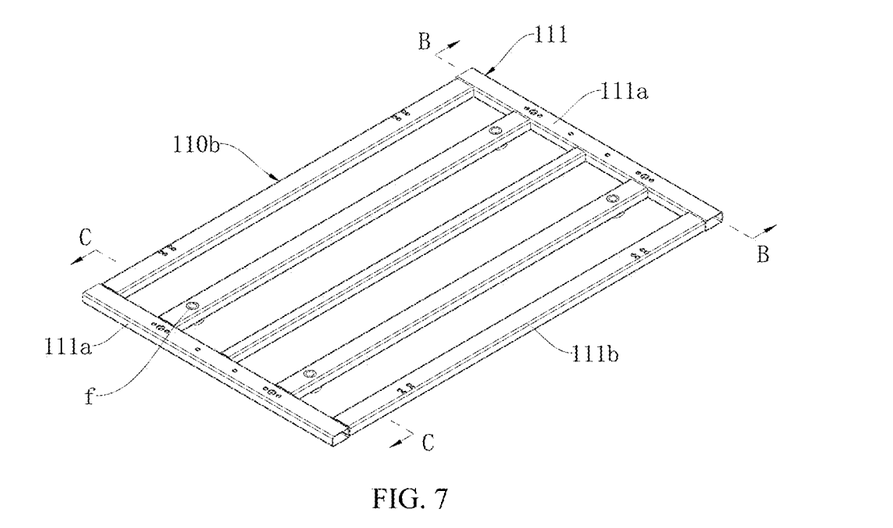
FIG. 7 is a schematic structural diagram of a bottom plate of a lower pallet according to some embodiments of this application.

In some embodiments, referring to FIG. 4 and FIG. 7, the base 111 is made by splicing a plurality of tubes.

A tube means a member in which a through-hole is made along an extension direction of the member. Depending on the shape of the cross-section that intersects the extension direction, the tube may be a circular tube, a square tube, a polygonal tube, or another form of tube. The tube may be a metal tube, a plastic tube, or a carbon fiber tube. The material type of the tube is not limited as long as the strength requirements of the base 111 can be met.

The base 111 is formed by splicing a plurality of tubes. The specific splicing manner of the tubes is not limited, as long as the spliced tubes can effectively support the supporting plate 112. For example, the base 111 is a quadrilateral base 111 formed by splicing a plurality of tubes. Alternatively, the base 111 may be a Tian-shaped base 111 formed by splicing a plurality of tubes, where the Tian-shape is like a square divided by a cross inside. Alternatively, the base 111 may be a "#"-shaped base 111 formed by splicing a plurality of tubes. The tubes may be spliced together by welding, bonding, fastening, snap-fastening, or other means.

The base 111 is formed by splicing tubes. The through-hole in the tube reduces the weight of the base 111 greatly, reduces the consumed material of the pallet 110, and in turn, reduces the manufacturing cost of the pallet structure 100.

Understandably, when the base 111 is formed by splicing tubes, the supporting plate 112 may be fixedly connected to some tubes, or fixedly connected to all tubes. The supporting plate 112 may be fixedly connected to the tubes by means of, but without being limited to, fastening, welding, or bonding.

In some embodiments, referring to FIG. 4 and FIG. 7, the base 111 includes two longitudinal tubes 111a and at least one transverse tube 111b. The two longitudinal tubes 111a are parallel to each other and spaced apart. Each transverse tube 111b is connected between the two longitudinal tubes 111a.

Understandably, the "two longitudinal tubes 111a are parallel to each other and spaced apart" means that the two longitudinal tubes are parallel to each other and spaced apart in a direction that intersects the extension direction of the longitudinal tubes 111a.

The longitudinal tube 111a and the transverse tube 111b are both tubes, and differ merely in the extension direction (or arrangement direction). The longitudinal tube 111a and the transverse tube 111b may be the same type of tube, or may be different types of tubes. For example, the longitudinal tube 111a is a circular tube, and the transverse tube 111b is a rectangular tube. For another example, the longitudinal tube 111a is a rectangular tube, and the transverse tube 111b is a square tube. For another example, the longitudinal tube 111a and the transverse tube 111b are both rectangular tubes.

When there is only one transverse tube 111b, the transverse tube 111b may be connected to middle positions on the two longitudinal tubes 111a to form an "I"-shaped base 111. When there are a plurality of transverse tubes 111b, the transverse tubes 111b may be spaced apart or connected to each other.

The base 111 is assembled by just connecting each transverse tube 111b between the two longitudinal tubes 111a, so that the base 111 is formed conveniently. The transverse tubes 111b and the longitudinal tubes 111a are connected in a staggered manner, so that the strength of the base 111 is high.

In some embodiments, there are at least two transverse tubes 111b. All the transverse tubes 111b are spaced apart along an extension direction of the longitudinal tubes 111a.

The greater the number of transverse tubes 111b, the stronger the base 111. However, to be cost-effective, the number of transverse tubes 111b is preferably 2 to 5.

The transverse tubes 111b are spaced apart from each other, so that the base 111 not only reduces the weight and consumed materials by virtue of the through-holes in the transverse tubes 111b and longitudinal tubes 111a, but also forms a weight reducing space through the gaps between the transverse tubes 111b. The base 111 can further reduce the weight and consumed materials.

In some embodiments, the longitudinal tube 111a and the transverse tube 111a are both rectangular tubes. Rectangular tubes include oblong tubes and square tubes. For example, the longitudinal tube 111a is an oblong tube, and the transverse tube 111b is a square tube. For another example, the longitudinal tube 111a is a square tube, and the transverse tube 111b is an oblong tube. For another example, the longitudinal tube 111a and the transverse tube 111b are both oblong tubes, or are both square tubes.

When the longitudinal tube 111a and the transverse tube 111b are both rectangular tubes, the surface that is of the longitudinal tube 111a and the transverse tube 111b and that is oriented toward the supporting plate 112 may be planar, and therefore, the base 111 can be surface-connected to the supporting plate 112, and the supporting plate 112 provides more stable support. In addition, the rectangular tube is technically mature and cost-effective, thereby reducing the manufacturing cost of the base 111.

In some embodiments, the base 111 is made of carbon fiber.

Carbon fiber (carbonfiber, CF for short) is a new type of high-strength high-modulus fiber material with a carbon content of at least 95%. Carbon fiber is lighter than metal aluminum, but stronger than steel, and is characterized by high hardness, high strength, light weight, high chemical resistance, and high-temperature resistance. Carbon fiber possesses the inherent intrinsic characteristics of carbon materials and also the softness and processability of textile fibers, and therefore, is a new generation of reinforcing fibers.

The base 111 being made of carbon fiber means that the base 111 is a plate-shaped member formed by weaving carbon fiber and containing a weight reducing space, or a member formed by splicing carbon fiber tubes, or a member formed by splicing carbon fiber rods. The specific form of the base is not limited.

In this case, the base 111 is made of carbon fiber, thereby being of low weight and high strength and ensuring high reliability of support of the pallet structure 100.

Figure 12:
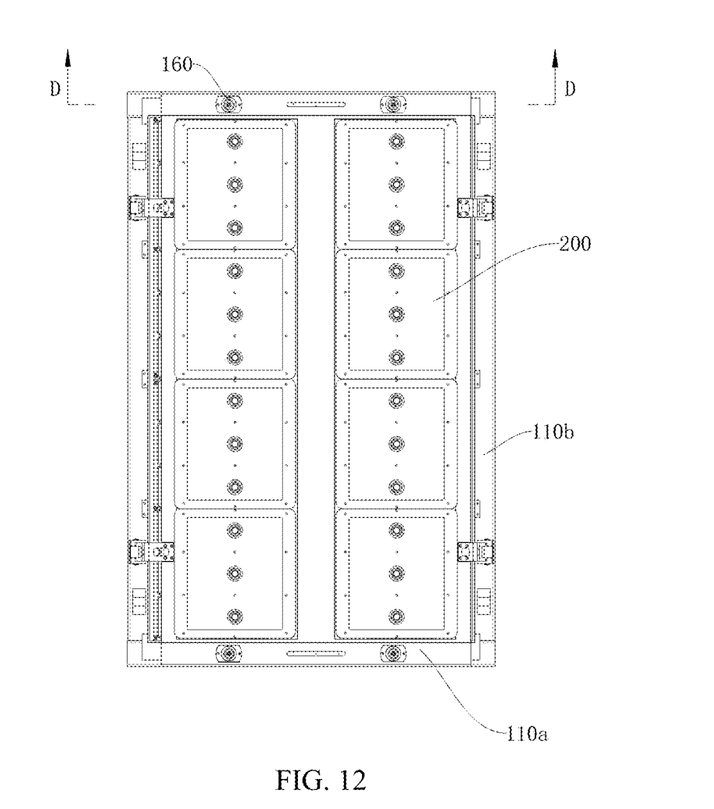
FIG. 12 is a top view of a battery electrolyte injection apparatus according to some other embodiments of this application.
Figure 13:
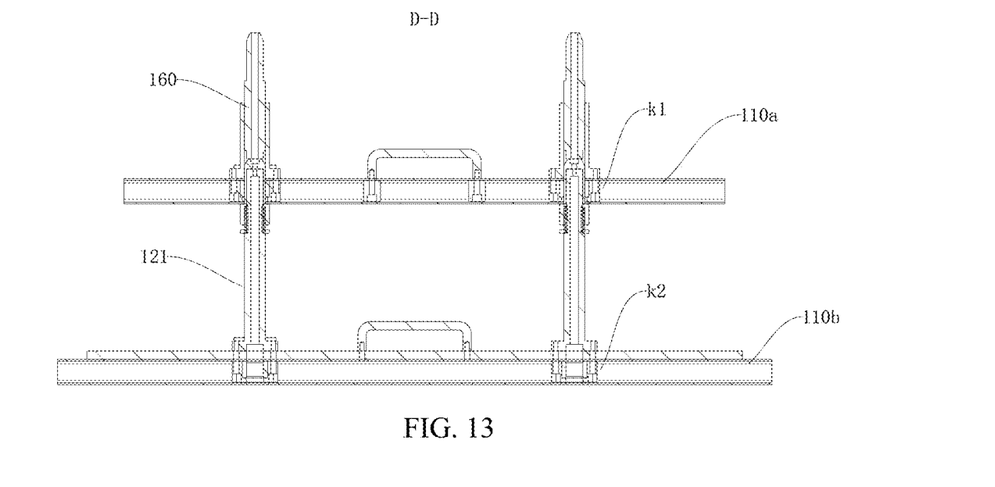
FIG. 13 is a sectional view obtained by sectioning along a line D-D shown in FIG. 12.

In some embodiments, referring to FIG. 1, FIG. 12, and FIG. 13, the supporting assembly 120 includes a guide post 121. One end of the guide post 121 is connected to a lower pallet 110, and the other end of the guide post is connected to an upper pallet 110.

There are a plurality of guide posts 121. The plurality of guide posts 121 are mounted vertically and arranged annularly apart from each other. One end of the guide post 121 is connected to the lower pallet 110b by fastening, welding, bonding, snap-fastening, or the like. The other end of the guide post 121 is connected to the upper pallet 110a by fastening, welding, bonding, snap-fastening, plugging, or the like.

Optionally, the guide post 121 is detachably connected to the upper pallet 110a. To assemble the pallet structure 100, the guide posts 121 are fixed on the lower pallet 110b first, and then the upper pallet 110a is mated to each guide post 121.

Optionally, the upper end of the guide post 121 includes a supporting bulge and a guide portion. The upper pallet 110a includes a guide hole. The guide portion extends into the guide hole. The upper pallet 110a is supported on the supporting bulge. The supporting bulge may be, but without limitation, formed by a shaft shoulder. To assemble the pallet structure 100, the upper pallet 110a is mounted from top downward. The guide portion of the guide post is inserted into the guide hole. The upper pallet 110a moves down to the supporting bulge along the guide portion. The guide portion may guide the motion of the upper pallet 110a, so that the upper pallet 110a is mounted more smoothly. Further, optionally, the guide portion is sheathed in a spring. One end of the spring is fixed onto the supporting bulge, and the other end of the spring is configured to abut against the upper pallet 110a. The downward movement distance of the upper pallet 110a can be flexibly adjusted by the spring.

In this case, the supporting assembly 120 is formed by guide posts 121, so that the structure is simple and the supporting is reliable.

It is hereby noted that when the pallet 110 includes the base 111, the guide posts 121 may be connected onto the base 111.

In some embodiments, the base 111 includes a hollow portion k. A reinforcing piece 113 is disposed in the hollow portion k.

When the base 111 is formed by splicing tubes, the hollow portion k of the base 111 is formed by through-holes in the tubes. When the base 111 is structured in other forms described above, the hollow portion k is formed by a part inside the base 111, where the part forms a weight reducing space.

The reinforcing piece 113 is a member configured to increase the structural strength of the hollow portion k of the base 111, and may be a metal part, a plastic part, a ceramic part, or the like, and may be in the shape of a block, a column, or a cylinder.

The reinforcing piece 113 may fill the entire hollow portion k, or fill a part of the hollow portion k. The reinforcing piece 113 may be fixed to the base 111 by bonding, fastening, welding, or the like.

When the base 111 is formed by splicing tubes, the reinforcing piece 113 may be fixedly disposed inside the tubes.

In this case, the reinforcing piece 113 is disposed in the hollow portion k of the base 111, thereby increasing the strength of the base 111 and ensuring high supporting strength of the pallet 110.

Figure 5:
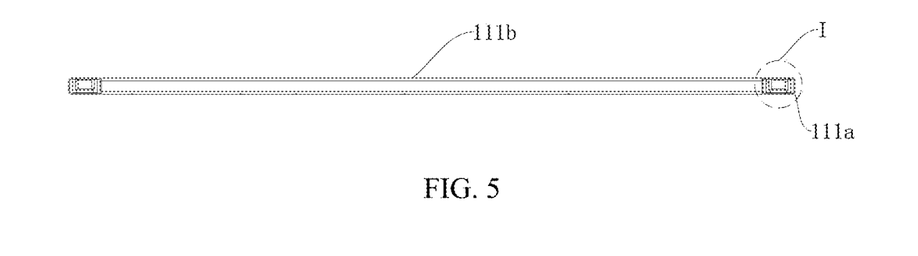
FIG. 5 is a sectional view obtained by sectioning along a line A-A shown in FIG. 4.
Figure 6:
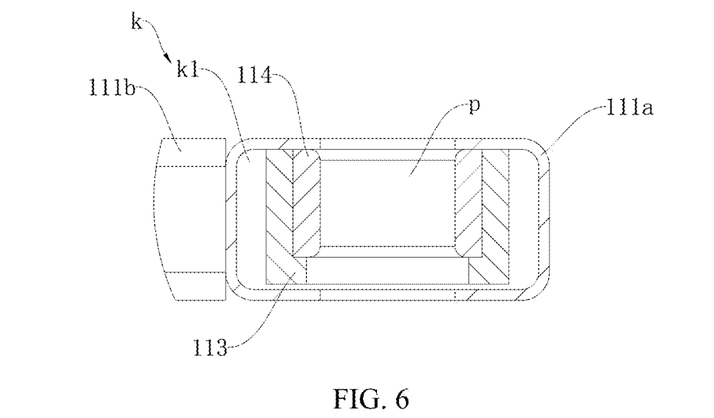
FIG. 6 is a close-up view of a part I shown in FIG. 5.

In some embodiments, referring to FIG. 4, FIG. 5, FIG. 6 together with FIG. 13, the hollow portion k of the base 111 of the upper pallet 110 includes a first hollow portion k1. The reinforcing piece 113 disposed in the first hollow portion k1 includes a mating hole p mated to the guide post 121.

The base 111 included in the upper pallet 110a is an upper base 111. The upper base 111 includes a first hollow portion k1. A reinforcing piece 113 is disposed in the first hollow portion k1. The reinforcing piece 113 includes a mating hole p that can be mated to the guide post 121. The reinforcing piece 113 may cylindrical. When mated to the mating hole p on the reinforcing piece 113, the guide post 121 is connected to the upper pallet 110a.

When the guide post 121 includes the guide portion, the guide portion is mated to the mating hole p, and the guide portion can slide along the mating hole p.

In this case, the reinforcing piece 113 in the first hollow portion k1 of the base 111 of the upper pallet 110a includes a mating hole p mated to the guide post 121. The mating hole p formed by the reinforcing piece 113 can increase the strength and reliability of connection between the upper pallet 110a and the guide post 121, and prevent the first hollow portion k1 of the upper pallet 110a from being deformed under pressure.

In some embodiments, referring to FIG. 12 and FIG. 13, the pallet structure 100 further includes a supporting post 160. One end of the supporting post 160 is disposed on the first hollow portion k1, and the other end of the supporting post extends away from the lower pallet 110b. In an application scenario, the injection mechanism 200 is mounted on a top plate (not shown) first, and then the top plate moves down into position along the supporting post 160. At this time, the top plate is supported on the supporting post 160, and the injection mechanism 200 is supported on the upper pallet 110a.

In this case, the supporting post 160 is disposed on the first hollow portion k1. The reinforcing piece 113 in the first hollow portion k1 can support the supporting post 160 firmly, thereby preventing the pallet 110 from being deformed under a local pressure.

Figure 8:
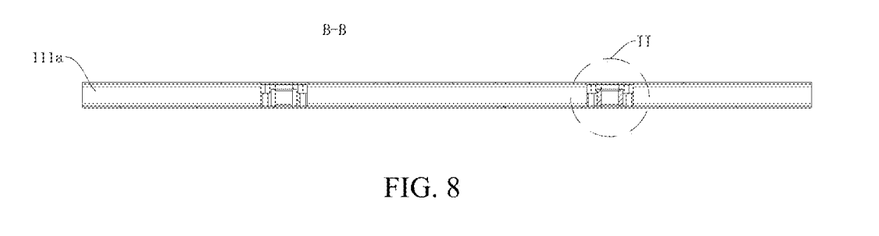
FIG. 8 is a sectional view obtained by sectioning along a line B-B shown in FIG. 7.
Figure 9:
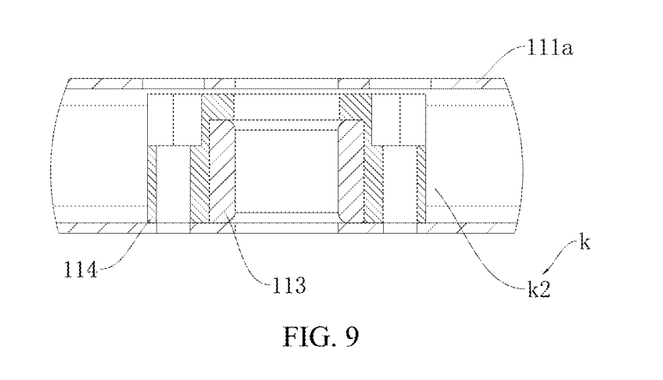
FIG. 9 is a close-up view of a part II shown in FIG. 8.

In some embodiments, referring to FIG. 7, FIG. 8, FIG. 9 together with FIG. 13, the hollow portion k of the base 111 of the lower pallet 110 includes a second hollow portion k2. The guide post 121 is disposed on the second hollow portion k2 and supported on the reinforcing piece 113.

The base 111 included in the lower pallet 110b is a lower base 111. The lower base 111 includes a second hollow portion k2. The reinforcing piece 113 is disposed in the second hollow portion k2. The guide post 121 is disposed on the second hollow portion k2 and supported on the reinforcing piece 113. The reinforcing piece 113 may be in the form of a block, a cylinder, or the like. The specific form is not limited. The reinforcing piece 113 is in contact with an inner wall of the second hollow portion k2 in a vertical direction, so as to apply a supporting force to the second hollow portion k2 and increase the structural strength of the second hollow portion k2.

Understandably, when disposed on the second hollow portion k2, the guide post 121 may be in direct contact with, or out of contact with, the reinforcing piece 113 disposed in the second hollow portion k2. When the guide post 121 is in direct contact with the reinforcing piece 113, the second hollow portion k2 includes a corresponding hole structure. Through the hole structure, the guide post 121 is supported on the reinforcing piece 113.

In this case, the reinforcing piece 113 is disposed in the second hollow portion k2 to increase the structural strength of the second hollow portion k2 and prevent the guide post 121 from being deformed under pressure when the guide post is supported inside a second hollow.

Figure 10:
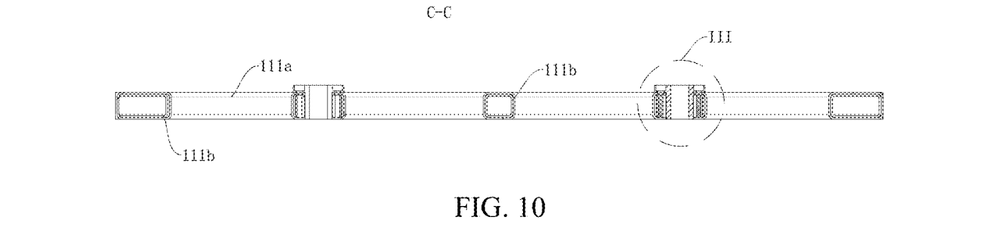
FIG. 10 is a sectional view obtained by sectioning along a line C-C shown in FIG. 7.
Figure 11:
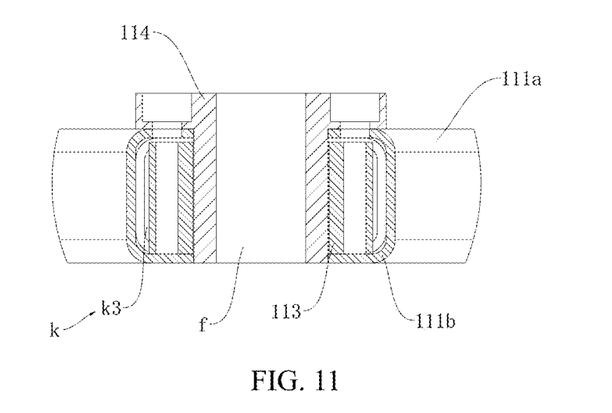
FIG. 11 is a close-up view of a part III shown in FIG. 10.

In some embodiments, referring to FIG. 7, FIG. 10, and FIG. 11, the hollow portion k of the base 111 of the lower pallet 110 further includes a third hollow portion k3. The reinforcing piece 113 disposed in the third hollow portion k3 includes a positioning hole f. The positioning hole f is configured to mate with a positioning mechanism.

In an application scenario, when the pallet structure 100 moves to an injection workspace along with a production line, the positioning mechanism extends into the positioning hole f of the lower pallet 110b to fix the pallet structure 100 at the injection workspace, thereby facilitating subsequent injection operations. The positioning mechanism may include, but without limitation, a piston rod. When stretching and retracting, the piston rod can enter and exit the positioning hole f.

In this case, the positioning hole f is formed by the reinforcing piece 113 of the third hollow portion k3, thereby improving the positioning reliability of the third hollow portion k3 and the positioning mechanism and preventing the third hollow portion k3 from being deformed under the action of the positioning mechanism.

In some embodiments, when a corresponding channel (such as a mating hole p or a positioning hole f) is made on the reinforcing piece 113, a bushing 114 is sheathed in the channel of the reinforcing piece 113. The guide post 121 or the positioning mechanism is mated to the reinforcing piece 113 through the bushing 114. The bushing 114 reduces the friction between the positioning mechanism or the guide post 121 and the reinforcing piece 113, and improves the lifespan of the reinforcing piece 113.

In some embodiments, referring to FIG. 1, the pallet structure 100 further includes a spacer 130. The spacer 130 is disposed on a lower pallet 110 and is configured to partition the pallet 110 into at least two placement regions q. Each placement region q is configured to place a battery cell.

The spacer 130 may be a partition bar, a partition rod, a partition sheet, or the like. The number of spacers 130 may be plural, and is not specifically limited, as long as the spacer can partition the region of the pallet 110.

When the pallet 110 includes a supporting plate 112, the spacer 130 is disposed on the supporting plate 112. The supporting plate 112 itself may include a limiting frame. The spacer 130 coordinates with the limiting frame to form each placement region q. The limiting frame prevents the battery cell from detaching from the pallet 110. The partitioning form of the placement region q is not specifically limited herein.

In this case, the spacer 130 partitions the region of the pallet 110 into a plurality of placement regions q. The placement regions q can restrict displacement of the battery cell on the pallet 110, implement more convenient positioning of the battery cell on the pallet 110, and facilitate placement of the battery cell.

In some embodiments, referring to FIG. 1, the pallet structure 100 further includes a first snap-fastener 140 and a second snap-fastener 150 that are detachably snap-fastened. The first snap-fastener 140 and the second snap-fastener 150 are disposed on the two pallets 110 respectively.

The specific structure of the first snap-fastener 140 and the second snap-fastener 150 is not limited herein, as long as the detachable snap-fastening can be implemented between the two snap-fasteners. For example, both the first snap-fastener 140 and the second snap-fastener 150 can rotate relative to the pallet 110 on which the snap-fasteners are located. Of the first snap-fastener 140 and the second snap-fastener 150, one includes a hook, and the other includes a hole. When the first snap-fastener 140 and the second snap-fastener 150 are rotated toward each other until the hook fits into the hole, the first snap-fastener 140 and the second snap-fastener 150 are snap-fastened. When the first snap-fastener 140 and the second snap-fastener 150 are rotated away from each other until the hook is disengaged from the hole, the first snap-fastener 140 is disengaged from the second snap-fastener 150.

During assembling of the pallet structure 100, when the upper pallet 110a moves down in position along the guide post 121, the first snap-fastener 140 and the second snap-fastener 150 are fastened tightly to prevent the upper pallet 110a from detaching from the guide post 121, thereby improving the reliability of mounting of the upper pallet 110a.

In an embodiment of this application, the pallet structure 100 includes an upper pallet 110a, a lower pallet 110b, and a plurality of guide posts 121. The upper pallet 110a and the lower pallet 110b are spaced apart vertically. All the guide posts 121 are connected to the upper pallet 110a and the lower pallet 110b. The upper pallet 110a and the lower pallet 110b each include a base 111 and a supporting plate 112. The supporting plate 112 is disposed on the corresponding base 111. Each base 111 is a hollow member formed by splicing tubes.

According to a second aspect, an embodiment of this application further provides a battery electrolyte injection apparatus 1000. Referring to FIG. 1, the apparatus includes the pallet structure 100 and an injection mechanism 200. The supporting surface m of a lower pallet 110 is configured to place a battery cell. The injection mechanism 200 is supported on the supporting surface m of an upper pallet 110 and is configured to inject an electrolytic solution into the battery cell.

The injection mechanism 200 is a mechanism configured to communicate with an electrolyte supply source and inject an electrolytic solution into the battery cell through an injection port of the battery cell. The injection mechanism 200 generally includes a nozzle 222. The nozzle 222 is configured to be butt-jointed to the injection port. As a common component in the field of battery electrolyte injection, the injection mechanism 200 is of a structure not specifically limited herein.

During electrolyte injection, the injection mechanism 200 is placed on the upper pallet 110a. The battery cell is placed on the lower pallet 110b. The nozzle 222 of the injection mechanism 200 is butt-jointed to the injection port. Understandably, an avoidance hole is made on the upper pallet 110a. The nozzle 222 of the injection mechanism 200 passes through the avoidance hole to get butt-jointed to the injection port of the battery cell placed on the lower pallet 110b.

The number of injection mechanisms 200 may be plural. Each injection mechanism 200 may be equipped with a plurality of nozzles 222, so as to inject the electrolytic solution into a plurality of battery cells simultaneously.

Due to the relatively low manufacturing cost of the pallet structure 100, the manufacturing cost of the battery electrolyte injection apparatus 1000 is relatively low. Definitely, the battery electrolyte injection apparatus 1000 achieves all the beneficial effects mentioned above, details of which are omitted here.

Figure 14:
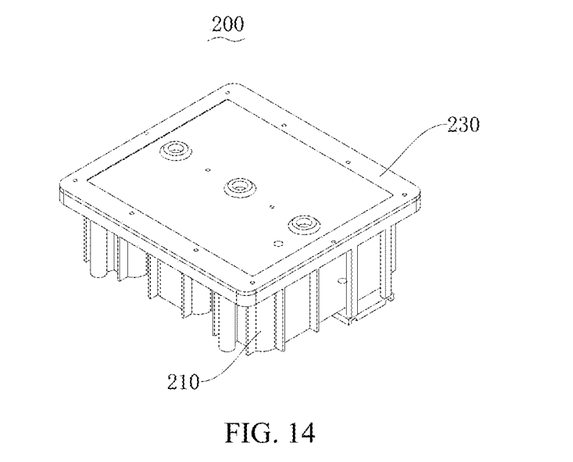
FIG. 14 is a schematic structural diagram of an injection mechanism according to some embodiments of this application.
Figure 15:
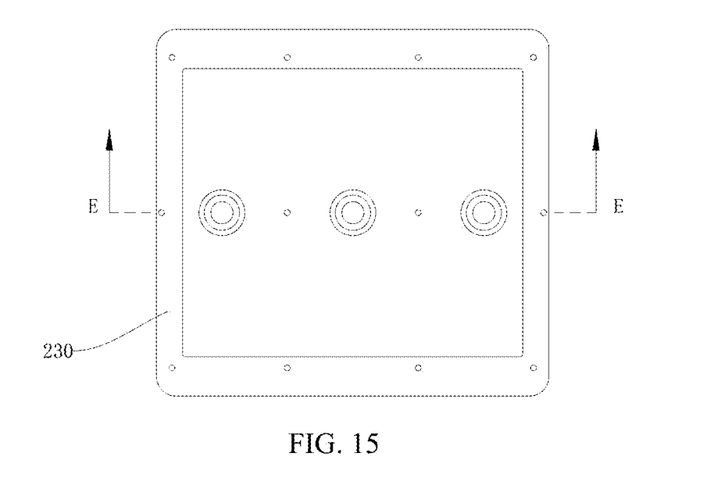
FIG. 15 is a top view of the injection mechanism shown in FIG. 14.
Figure 16:
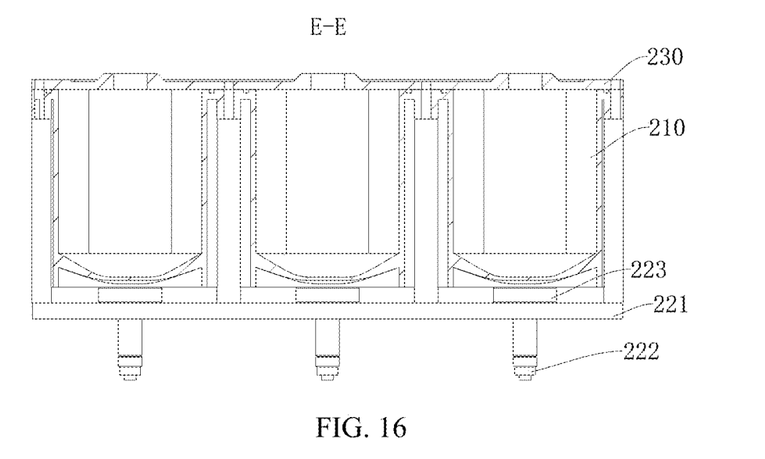
FIG. 16 is a sectional view obtained by sectioning along a line E-E shown in FIG. 15.

In some embodiments, referring to FIG. 14, FIG. 15, and FIG. 16, the injection mechanism 200 includes an injection cup 210 and a nozzle assembly 220. The injection cup 210 is disposed on the upper pallet 110. The nozzle assembly 220 is mated to the injection cup 210 detachably and communicates with the injection cup 210, and is configured to inject the electrolytic solution into the battery cell.

The injection cup 210 is configured to accommodate the electrolytic solution. The injection cup 210 may be equipped with a pressure hole (not shown in the drawing). The pressure hole communicates with an air source. When the injection cup 210 is pressurized, the electrolytic solution can be more quickly injected into the battery cell through the nozzle 222. The injection cup 210 is further equipped with a refill hole (not shown in the drawing) through which the electrolytic solution is poured.

The nozzle assembly 220 is detachably connected to the injection cup 210. When the nozzle assembly 220 is connected to the injection cup 210, the nozzle assembly 220 communicates to the injection cup 210, and the electrolytic solution in the injection cup 210 enters the nozzle assembly 220 and is injected into the battery cell.

When a nozzle 222 is damaged, the nozzle assembly 220 can be removed and replaced without a need to remove the whole injection mechanism 200, thereby greatly facilitating the repair of the injection mechanism 200.

Optionally, the injection mechanism 200 further includes an injection sheet metal part 230. The injection cup 210 is mounted on the injection sheet metal part 230. The injection sheet metal part 230 is configured to be mounted on a top plate (not shown in the drawing).

Figure 17:
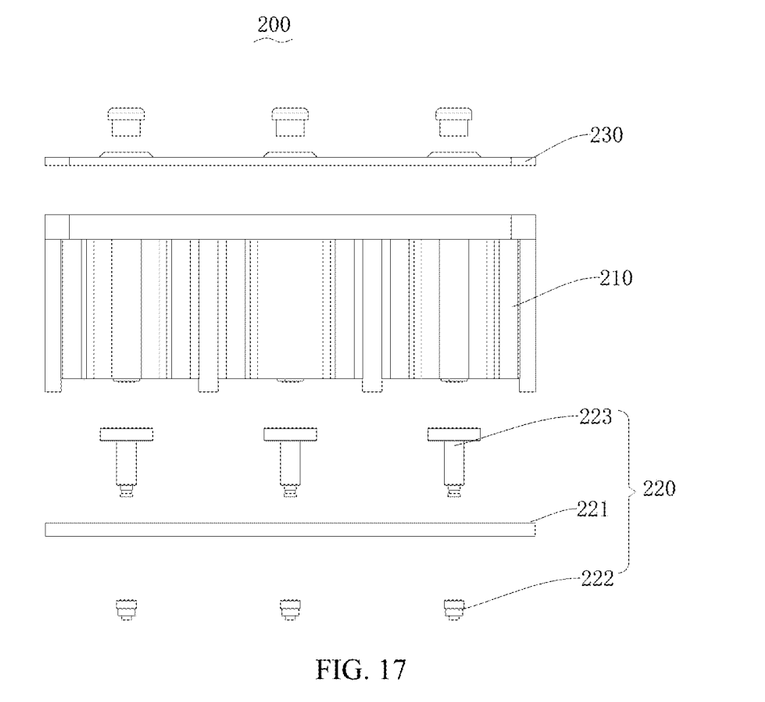
FIG. 17 is an exploded view of the injection mechanism shown in FIG. 14.

In some embodiments, referring to FIG. 16 and FIG. 17, the nozzle assembly 220 includes a fixing plate 221, at least one nozzle 222, and a mounting piece 223. The fixing plate 221 is detachably connected to the injection cup 210. The mounting piece 223 is disposed on the fixing plate 221. Each nozzle 222 is mounted on the mounting piece 223. The mounting piece 223 is configured to implement communication between the injection cup 210 and each nozzle 222.

The fixing plate 221 is configured to be detachably connected to the injection cup 210, and specifically, where the detachable connection may be threaded connection, snap-fastening, and the like, as long as the fixing plate 221 is detachable from the injection cup 210.

A flow path exists inside the mounting piece 223. When the mounting piece 223 is mounted on the fixing plate 221 and the fixing plate 221 is connected to the injection cup 210, the flow path of the mounting piece 223 communicates with the outlet of the injection cup 210. The nozzle 222 is mounted on the mounting piece 223 and communicates with the flow path. The electrolytic solution flows from the injection cup 210 to the flow path, and then flows to the nozzle 222.

The mounting piece 223 may be detachably connected to the fixing plate 221, and the nozzle 222 may be detachably connected to the mounting piece 223. When any one of the mounting piece 223 or the nozzle 222 is damaged, other parts do not need to be replaced, thereby reducing the repair cost.

A plurality of mounting pieces 223 may be disposed on the fixing plate 221, and a nozzle 222 is disposed corresponding to each mounting piece 223. Alternatively, one mounting piece 223 may be disposed on the fixing plate 221, and the mounting piece 223 includes a plurality of mounting ports. A nozzle 222 is mounted at each mounting port correspondingly.

When one nozzle 222 is damaged, other nozzles 222 are usually also damaged. In this case, because the fixing plate 221 is detachably connected to the injection cup 210 on the injection mechanism 200, at least one nozzle 222 may be disposed on the fixing plate 221. Therefore, at least one nozzle 222 can be replaced at a time, thereby improving the efficiency of replacing the nozzle 222.

The technical features in the foregoing embodiments may be combined arbitrarily. For brevity, not all possible combinations of the technical features in the embodiments are described. However, to the extent that no conflict exists, all such combinations of the technical features are considered falling within the scope hereof.

The foregoing embodiments merely describe several implementations of this application. The description is relatively detailed, but constitutes no limitation on the patent scope hereof. It is hereby noted that several variations and improvements, which may be made to the embodiments by a person of ordinary skill in the art without departing from the concept of this application, fall within the protection scope of this application. Therefore, the protection scope of this application is subject to the claims appended hereto.

What is claimed is:

1. A pallet structure, comprising:
   two pallets, wherein each of the pallets comprises a supporting surface, and the two pallets are spaced apart vertically; and
   a supporting assembly, disposed between the two pallets, wherein at least one of the pallets comprises a base and a supporting plate, the supporting plate is disposed on the base and comprises the supporting surface, and the base is a hollow structure, and the base comprises a hollow portion, and a reinforcing structure is disposed to fill at least a part of the hollow portion.

2. The pallet structure according to claim 1, wherein the base is made by splicing a plurality of tubes.

3. The pallet structure according to claim 2, wherein the base comprises two longitudinal tubes and at least one transverse tube; and
the two longitudinal tubes are parallel to each other and spaced apart, and each transverse tube is connected between the two longitudinal tubes.

4. The pallet structure according to claim 3, wherein there are at least two transverse tubes, and all the transverse tubes are spaced apart along an extension direction of the longitudinal tubes.

5. The pallet structure according to claim 3, wherein the longitudinal tubes and the transverse tubes are both rectangular tubes.

6. The pallet structure according to claim 1, wherein the base is made of carbon fiber.

7. The pallet structure according to claim 1, wherein the supporting assembly comprises a guide post, one end of the guide post is connected to a lower pallet, and the other end of the guide post is connected to an upper pallet.

8. The pallet structure according to claim 1, wherein the hollow portion of the base of the upper pallet comprises a first hollow portion, and the reinforcing structure disposed in the first hollow portion comprises a mating hole mated to a guide post.

9. The pallet structure according to claim 1, wherein the hollow portion of the base of the lower pallet comprises a second hollow portion, and a guide post is inserted into the second hollow portion and supported on the reinforcing structure.

10. The pallet structure according to claim 1, wherein the hollow portion of the base of the lower pallet further comprises a third hollow portion, the reinforcing structure disposed in the third hollow portion comprises a positioning hole, and the positioning hole is configured to mate with a positioning structure inserted into the positioning hole.

11. The pallet structure according to claim 1, wherein the pallet further comprises a spacer, the spacer is disposed on a lower pallet and is configured to partition the pallet into at least two placement regions, and each placement region is configured to place a battery cell.

12. The pallet structure according to claim 1, wherein the pallet structure further comprises a first snap-fastener and a second snap-fastener that are detachably snap-fastened, and the first snap-fastener and the second snap-fastener are disposed on two bases of the two pallets respectively.

13. A battery electrolyte injection apparatus, wherein the apparatus comprises:
the pallet structure according to claim 1, wherein the supporting surface of a lower pallet is configured to place a battery cell; and
an injector, wherein the injector is supported on the supporting surface of an upper pallet and is configured to inject an electrolytic solution into the battery cell.

14. The battery electrolyte injection apparatus according to claim 13, wherein the injector comprises:
an injection cup, disposed on the upper pallet; and
a nozzle assembly, mated to the injection cup detachably and communicating with the injection cup, and configured to inject the electrolytic solution into the battery cell.

15. The battery electrolyte injection apparatus according to claim 14, wherein the nozzle assembly comprises:
a fixing plate, detachably connected to the injection cup; and
at least one nozzle and a mounting structure, wherein the mounting structure is disposed on the fixing plate, each nozzle is mounted on the mounting structure, and the mounting structure is configured to implement communication between the injection cup and each nozzle.

* * * * *